United States Patent
Bellamy et al.

(10) Patent No.: US 9,483,573 B2
(45) Date of Patent: Nov. 1, 2016

(54) CONTEXT AWARENESS IN AUDITORY BROWSING

(71) Applicant: International Business Machines Corporation, Armonk, NY (US)

(72) Inventors: Rachel K. E. Bellamy, Bedford, NY (US); Peter K. Malkin, Ardsley, NY (US); John T. Richards, Chappaqua, NY (US); Sharon M. Trewin, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 13/708,142

(22) Filed: Dec. 7, 2012

(65) Prior Publication Data

US 2014/0164894 A1    Jun. 12, 2014

(51) Int. Cl.
G06F 17/20 (2006.01)
G06F 17/30 (2006.01)
G10L 13/00 (2006.01)

(52) U.S. Cl.
CPC ......... G06F 17/30899 (2013.01); G10L 13/00 (2013.01)

(58) Field of Classification Search
CPC .... G06F 17/211; G06F 17/24; G06F 17/246; G06F 17/20; G06F 17/30899; G06F 17/30893; G06F 17/3074; G06F 17/3089; G06F 17/2785; G06F 3/0482; G06F 17/30864; G10L 13/00
USPC ...................................................... 715/209
See application file for complete search history.

(56) References Cited

U.S. PATENT DOCUMENTS

| | | | | |
|---|---|---|---|---|
| 6,046,722 A | * | 4/2000 | McKiel, Jr. | 715/862 |
| 6,834,373 B2 | * | 12/2004 | Dieberger | 715/247 |
| 2002/0156807 A1 | * | 10/2002 | Dieberger | G06F 3/016 |
| | | | | 715/247 |
| 2008/0229206 A1 | * | 9/2008 | Seymour et al. | 715/727 |
| 2009/0048821 A1 | | 2/2009 | Yam et al. | |

(Continued)

FOREIGN PATENT DOCUMENTS

| EP | 1654631 A2 | 5/2006 |
|---|---|---|
| EP | 1573562 A4 | 12/2007 |

OTHER PUBLICATIONS

Goose et al, "A 3D Audio Only Interactive Web Browser: Using Spatialization to Convey Hypermedia Document Structure", Multimedia Department, Siemens Corporate Research, pp. 1-16, http://www.tav.net/audio/audioweb/index.htm.

(Continued)

*Primary Examiner* — Scott Baderman
*Assistant Examiner* — Jason Edwards
(74) *Attorney, Agent, or Firm* — David Zwick (57) ABSTRACT

In a method for generating an audio summary of a portion of an electronic document, a user input selecting a focus position within a rendered electronic document is received. The plurality of document elements included in the rendered electronic document is identified. A plurality of audio objects corresponding to the plurality of document elements is generated. An audio signal is generated. The audio signal includes a subset of the plurality of audio objects corresponding to a subset of the plurality of document elements contained within a predetermined range from the focus position. The audio signal indicates the spatial relation between the elements of the elements subset. The audio signal is rendered to the user.

18 Claims, 8 Drawing Sheets

(56) References Cited

U.S. PATENT DOCUMENTS

2010/0199215 A1\* 8/2010 Seymour et al. ............. 715/808
2012/0046947 A1\* 2/2012 Fleizach ....................... 704/260

OTHER PUBLICATIONS

Goose et al, "Enhancing Web Accessibility Via the Vox Portal and a Web Hosted Dynamic HTML<->VoxML Conventer", pp. 1-12, http://www9.org/w9/354/354.html.

Advisory Group on Computer Graphics, "Using Audio in Multimedia", http://www,agocg.uk/brief/audio.htm, pp. 1-6.

Goose et al, "Streaming Speech3: A Framework for Generating, and Streaming 3D Text-To-Speech and Audio Presentations to Wireless PDAs as Specified Using Extensions to SMIL", Copyright May 7, 2002, pp. 1-14, http://www2002.org/CDROM/refereed/212/.

Sodnik et al, "Multiple Spatial Sounds in Hierarchical Menu Navigation for Visually Impaired Computer Uses", Science Direct, 2011, pp. 100-112, http://www.sciencedirect.com/science/article/pii/S1071581910001266.

Ebina et al, "An Analysis of User Behavior in an Interactive Auditory Field", Sep. 1996, pp. 1-8, BCS—FACA Workshop on Formal Aspects of the Human Computer Interface, ISBN 3-540-76105-5.

Drake, "Non-Visual User Interfaces" Thesis, Oct. 2003, pp. 1-110, Curtin University of Technology, Perth, Australia.

Roth et al, "Audio-Haptic Internet Browser and Associated Tools for Blind and Visually Impaired Computer Users", University of Geneva, Computer Vision Group Workshop, 6 pgs, Mar. 22-24, 2000.

Arons, "Hyperspeech: Navigating in Speech-Only Hypermedia", MIT Media Laboratory, Ju[ertext 1991 {rpceeds. [gs 133-146, Dec. 1991.

Arons, "A Review of the Cocktail Party Effect", MIT Media Lab, pp. 1-18, http://xenia.media.mit.edu/~barons/html/cocktail.html.

\* cited by examiner

(12) United States Patent
US 9,483,573 B2

CONTEXT AWARENESS IN AUDITORY BROWSING

TECHNICAL FIELD

The present invention relates generally to accessibility to electronic documents for visually impaired users and more specifically to enhancing auditory browsing.

BACKGROUND

The Internet has become an important communication tool. The widespread use of graphical user interfaces (GUIs) increasingly bars visually impaired people from accessing digital information. To facilitate visually impaired person's access to digital data that is offered over internet the development of electronic aids has been ongoing for several decades. Blind and visually impaired computer users currently benefit from many forms of adaptive technology, including speech synthesis, large-print processing, braille desktop publishing, and voice recognition. However, presently a very few of the foregoing tools have been adopted for auditory browsing.

There are multiple screen reading tools, including software programs, available to blind and visually impaired persons enabling them to operate computers and/or mobile devices and to browse the internet in an auditory manner. However, auditory browsing of an information space typically proceeds in serial fashion. As the users move their focus from one webpage element to another, the software tool typically presents auditorially to the users the one or more elements that have focus. Those elements are typically presented in sequence. Text information is typically rendered as synthesized speech. Consequently, this approach is time consuming and provides no awareness of other webpage elements spatially located near the focused-on webpage elements.

SUMMARY

In one aspect, a method for generating an audio summary of a portion of an electronic document is provided. The method comprises receiving user input selecting a focus position within a rendered electronic document. The method further comprises identifying a plurality of document elements included in the rendered electronic document. The method further comprises generating a plurality of audio objects corresponding to the plurality of document elements. The method further comprises generating an audio signal that includes a subset of the plurality of audio objects corresponding to a subset of the plurality of document elements contained within a predetermined range from the focus position. The audio signal indicates the spatial relation between the elements of the elements subset. The method further comprises rendering the audio signal to the user.

In another aspect, a computer program product for generating an audio summary of a portion of an electronic document is provided. The computer program product comprises one or more computer-readable tangible storage devices and a plurality of program instructions stored on at least one of the one or more computer-readable tangible storage devices. The plurality of program instructions comprises program instructions to receive user input selecting a focus position within a rendered electronic document. The plurality of program instructions further comprises program instructions to identify a plurality of document elements included in the rendered electronic document. The plurality of program instructions further comprises program instructions to generate a plurality of audio objects corresponding to the plurality of document elements. The plurality of program instructions further comprises program instructions to generate an audio signal that includes a subset of the plurality of audio objects corresponding to a subset of the plurality of document elements contained within a predetermined range from the focus position. The audio signal indicates the spatial relation between the elements of the elements subset. The plurality of program instructions further comprises program instructions to render the audio signal to the user.

In yet another aspect, a computer system for generating an audio summary of a portion of an electronic document is provided. The computer system comprises one or more processors, one or more computer-readable tangible storage devices, and a plurality of program instructions stored on at least one of the one or more storage devices for execution by at least one of the one or more processors. The plurality of program instructions comprises program instructions to receive user input selecting a focus position within a rendered electronic document. The plurality of program instructions further comprises program instructions to identify a plurality of document elements included in the rendered electronic document. The plurality of program instructions further comprises program instructions to generate a plurality of audio objects corresponding to the plurality of document elements. The plurality of program instructions further comprises program instructions to generate an audio signal that includes a subset of the plurality of audio objects corresponding to a subset of the plurality of document elements contained within a predetermined range from the focus position. The audio signal indicates the spatial relation between the elements of the elements subset. The plurality of program instructions further comprises program instructions to render the audio signal to the user.

DETAILED DESCRIPTION

Embodiments of the present invention recognize that there are multiple screen reading tools, including software programs (e.g. the so called "talking browsers), available to blind and visually impaired persons enabling them to operate computers and/or mobile devices and to browse the internet in an auditory manner. It is to be noted that throughout the present document terms "blind" and "visually impaired" are interchangeably used. However, one problem with such browsers is that an overview of the web page or a portion of the web page is unavailable typically because this type of web browser moves from element to element in a sequential manner, as discussed below in conjunction with FIGS. 2A-2D. This is very limiting to an impaired user who may want, for example, to obtain an overview of the web page with a quick scan of at least a portion of the web page, which is possible by users who do not have a visual impairment.

The illustrative embodiments used to describe the invention generally address and solve the above-described problems and other problems related to context awareness in auditory browsing of electronic documents. Generally, an embodiment enables users to hear an audio summary of a portion of electronic document by leveraging the so-called "cocktail party effect", as discussed below. In one example, a user may provide a focus position and the desired direction within an electronic document (e.g., a web page) using a touch sensitive display or other input device. In response to the selected focus position and direction, an audio summary may be rendered to the user that summarizes a portion of the electronic document contained within the predetermined range from the focus position, in accordance with an embodiment of the present invention. Advantageously, the audio summary may provide an audio representation of elements or groups of elements contained within the predetermined range from the focus position and their spatial relation with respect to the focus position. Thus, various embodiments facilitate visually impaired users to have better awareness of an electronic document content during auditory browsing.

Embodiments of the present invention will now be described with reference to the figures. Various embodiments of the present invention may be implemented generally within any computing device suited for allowing visually impaired users to browse electronic documents. More specifically, embodiments of the present invention may be implemented in a mobile computing device, i.e. a cellular phone, GSM (Global System for Mobile communications) phone, media player, personal digital assistant (PDA), and the like, which may enable a user to browse electronic documents in auditory manner. While some embodiments of the present invention are described with reference to an exemplary mobile computing device, it should be appreciated that such embodiments are exemplary and are not intended to imply any limitation with regard to the environments or platforms in which different embodiments may be implemented.

Figure 1:
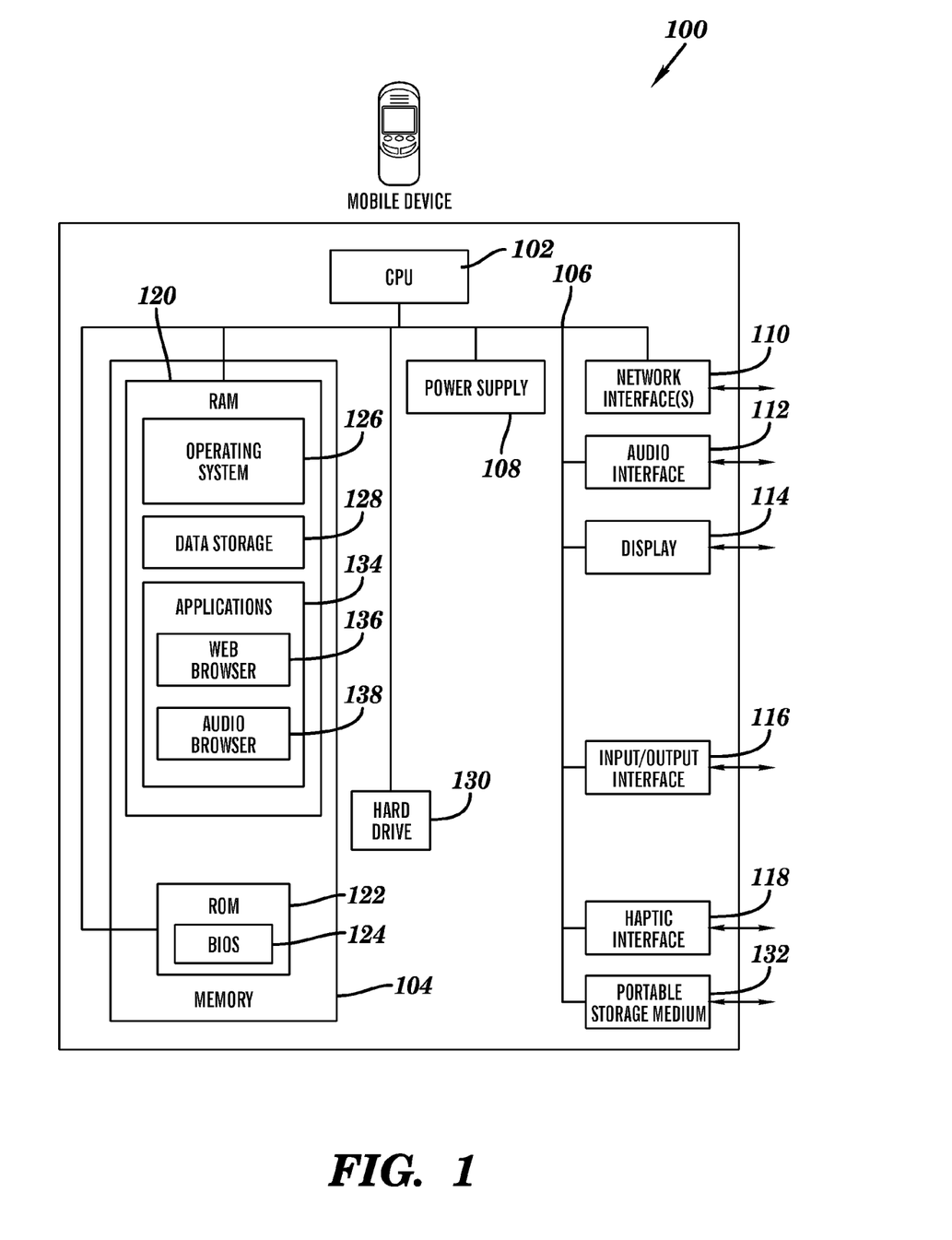
FIG. 1 is an illustration of a mobile device environment for auditory browsing of electronic documents in accordance with an embodiment of the present invention.

FIG. 1 is an illustration of a mobile device 100 environment for allowing visually impaired users to browse electronic documents in accordance with an embodiment of the present invention. Mobile device 100 may include many more or less components than those shown in FIG. 1. However, the components shown are sufficient to disclose an illustrative embodiment for practicing the present invention.

As shown in the figure, the client device 100 includes a processing unit (CPU) 102 in communication with a memory 104 via a bus 106. Mobile device 100 also includes a power supply 108, one or more network interfaces 110, an audio interface 112 that may be configured to receive an audio input as well as to provide an audio output, a display 114, an input/output interface 116, and a haptic interface 118. The power supply 108 provides power to the mobile device 100. A rechargeable or non-rechargeable battery may be used to provide power. The power may also be provided by an external power source, such as an AC adapter or a powered docking cradle that supplements and/or recharges a battery.

The network interface 110 includes circuitry for coupling the client device 100 to one or more networks, and is constructed for use with one or more communication protocols and technologies including, but not limited to, GSM, code division multiple access (CDMA), time division multiple access (TDMA), user datagram protocol (UDP), transmission control protocol/Internet protocol (TCP/IP), short message service (SMS), general packet radio service (GPRS), wireless application protocol (WAP), ultra wide band (UWB), IEEE 802.16 Worldwide Interoperability for Microwave Access (WiMax), session initiation protocol/real-time transport protocol (SIP/RTP), Bluetooth, Wi-Fi, ZigBee, universal mobile telecommunications system (UMTS), high-speed downlink packet access (HSDPA), wideband-CDMA (W-CDMA), or any of a variety of other wired and/or wireless communication protocols. The network interface 110 is also known as a transceiver, transceiving device, or network interface card (NIC).

The audio interface 112 is arranged to produce and receive audio signals such as the sound of a human voice. For example, the audio interface 112 may be coupled to a speaker (shown in FIG. 2), and/or microphone (not shown) to enable telecommunication with others and/or render audio signals received from, for example, an audio browser program 138. The display 114 may be a liquid crystal display (LCD), gas plasma, light emitting diode (LED), or any other type of display used with a mobile computing device. At least in some embodiments of the present invention, the display 114 may also include a touch sensitive screen arranged to receive input from an object such as a stylus or a human finger.

The client device 100 also includes the input/output interface 116 for communicating with external devices, such as a set of headphones (not shown), or other input or output devices not shown in FIG. 1. The input/output interface 116 can utilize one or more communication technologies, such as a universal serial bus (USB), infrared, Bluetooth®, or the like. The haptic interface 118 may be arranged to provide tactile feedback to a user of the mobile device 100. For example, the haptic interface 118 may be employed to vibrate the mobile device 100 in a particular way when, for example, another user of a mobile computing device is calling.

The memory 104 may include a RAM 120, a ROM 122, and other storage means. The memory 104 illustrates an example of computer-readable tangible storage media for storage of information such as computer readable instructions, data structures, program modules or other data. The memory 120 may also store a basic input/output system (BIOS) for controlling low-level operation of the mobile device 100. The memory 100 may also store an operating system 126 for controlling the operation of the mobile device 100. It will be appreciated that this component may include a general purpose operating system such as a version of UNIX, or LINUX®, or a specialized mobile communication operating system such as ANDROID®, Apple® iOS, BlackBerry® OS, and SYMBIAN OS®. The operating system 126 may include, or interface with a Java® virtual machine component that enables control of hardware components and/or operating system 126 operations via Java® application programs.

The memory 120 may further include one or more data storage units 128, which can be utilized by the mobile device 100 to store, among other things, applications and/or other data. For example, the data storage unit 128 may be employed to store information that describes various capabilities of the mobile device 100, a device identifier, and the like. The data storage unit 128 may also be used to store data generated by various applications, as described below.

In one embodiment, the data storage unit 128 may also include one or more audio objects generated by the audio browser program 138 as well as user's document browsing history. In this manner, the mobile device 100 may maintain, at least for some period of time, audio objects that may then be rendered to a user by employing, for example, the audio interface 112. The data storage unit 128 may further include cookies, and/or user preferences including, but not limited to user interface options and the like. At least a portion of the document browsing history, audio objects, and the like, may also be stored on an optional hard disk drive 130, optional portable storage medium 132, or other storage medium (not shown) within the mobile device 100.

Applications 134 may include computer executable instructions which, when executed by the mobile device 100, transmit, receive, and/or otherwise process messages (e.g., SMS, MMS, IMS, IM, email, and/or other messages), audio, video, and enable telecommunication with another computing device and/or with another user of another mobile device. Other examples of application programs include calendars, browsers, email clients, IM applications, VOIP applications, contact managers, task managers, database programs, word processing programs, security applications, spreadsheet programs, games, search programs, and so forth. Applications 134 may further include a web browser 136 and an audio browser 138.

The web browser 136 may include virtually any application for mobile devices configured to receive and render graphics, text, multimedia, and the like, employing virtually any web based language. In one embodiment, the web browser application 136 is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to render received information. However, any of a variety of other web based languages may also be employed.

The web browser 136 may be configured to enable a user to access a webpage and/or any other electronic document. The web browser 136 may be integrated with an auditory user interface, which may be configured to enable a visually impaired user to access the webpage and/or electronic document in an auditory manner.

Figure 2A:
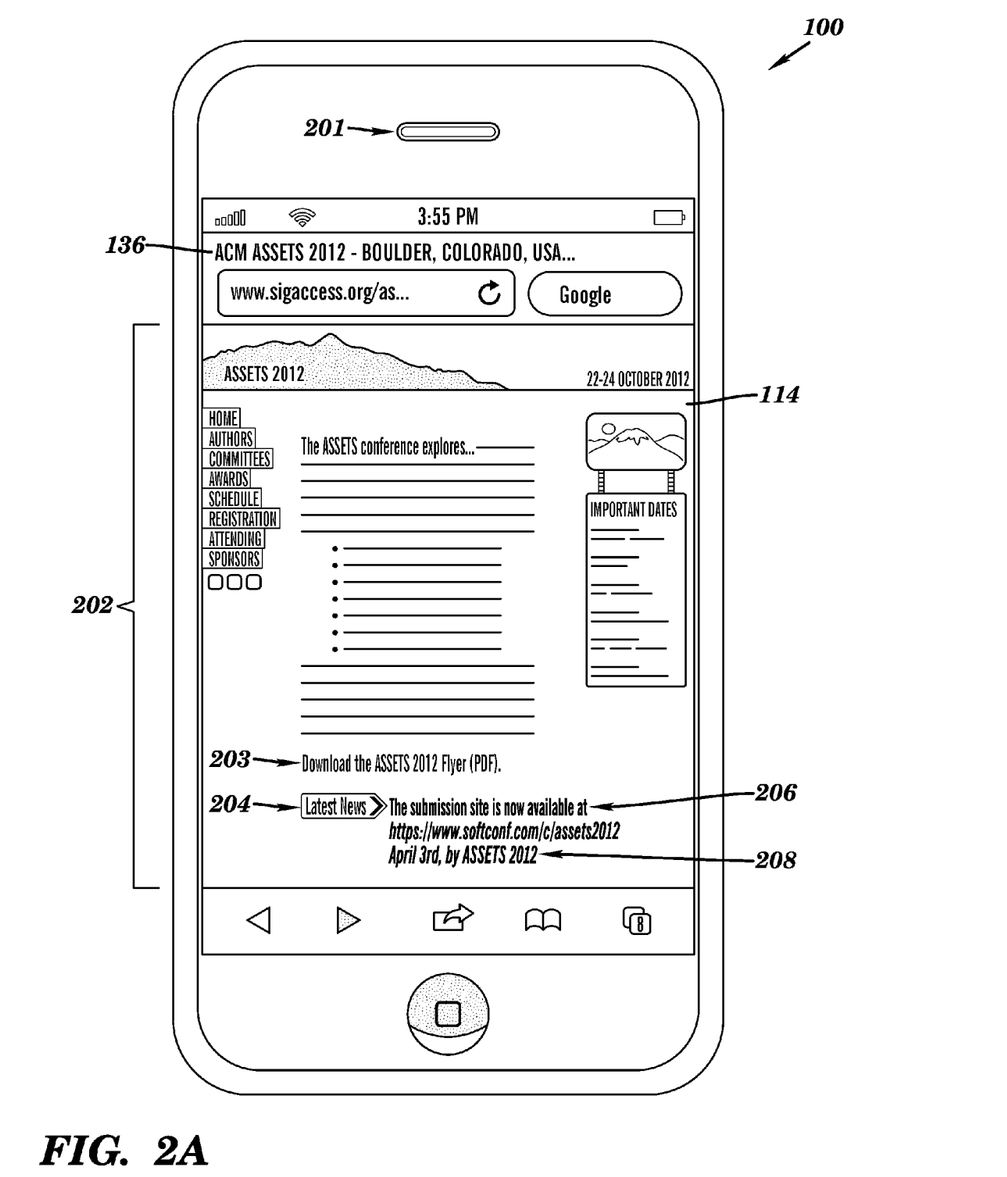
FIGS. 2A-2D are schematic diagrams illustrating an auditory browsing using a conventional auditory user interface of a mobile device.

Referring now to FIGS. 2A through 2D, audio browsing using a conventional auditory user interface of a mobile device is illustrated. The exemplary mobile device 100 illustrated in FIG. 2 may include a relatively large contact-sensitive display 114. Specifically, the contact-sensitive display 114 may be a resistive type touch screen that can sense the touch pressure applied by the user. In addition, the exemplary mobile device 100 may include a speaker 201 disposed within the housing of the mobile device 100. The speaker 201 may be employed to project audible sounds. The mobile device 100 may be capable of running relatively sophisticated applications, such as games, document processing applications, web browsers, and the like. The example illustrated in FIG. 2A depicts the mobile device 100 running the web browser 136. For illustrative purposes only assume that a visually impaired user has navigated to a particular web page 202 using the web browser 136. Typically, a web page contains visual information that is rendered by the web browser 136. The web page 202, shown in FIG. 2A, in addition to containing text content, such as, for example, text string 208, may also contain links to other web page files. For example, a link 203 may read "Download the ASSETS 2012 Flyer (PDF)" and may allow the user to download the corresponding file in PDF format. Another link 206 may allow the user to navigate to a submission site. Furthermore, the exemplary web page 202 may contain a variety of images, such as a button 204 located near the link 206. However, blind users cannot utilize the web page 202 rendered by the web browser 136, while visually impaired users may experience difficulty doing so. Accordingly, the mobile device 100 may be capable of running an auditory user interface that may assist blind and visually impaired users to access information when they use the mobile device 100. Specifically, the auditory user interface may be a screen reader program that cooperates with the web browser 136 and that reads aloud information appearing on the web page 202 in response to receiving an input from the visually impaired user, which may be a touch. The conventional auditory user interface may communicate directly with the contact-sensitive display 114, web browser 136 or any other application 134 running on the mobile device 100.

Figure 2B:
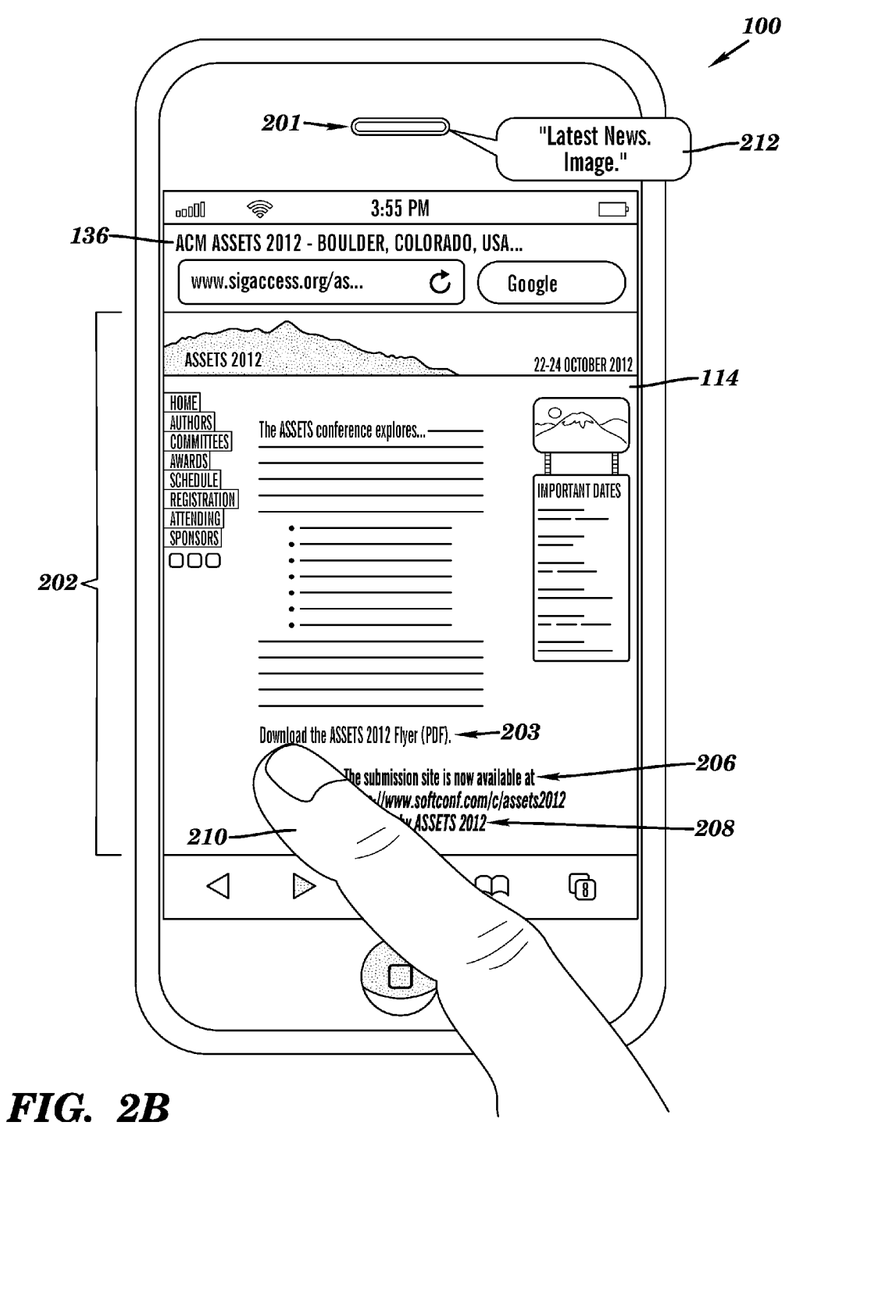
Figure 2C:
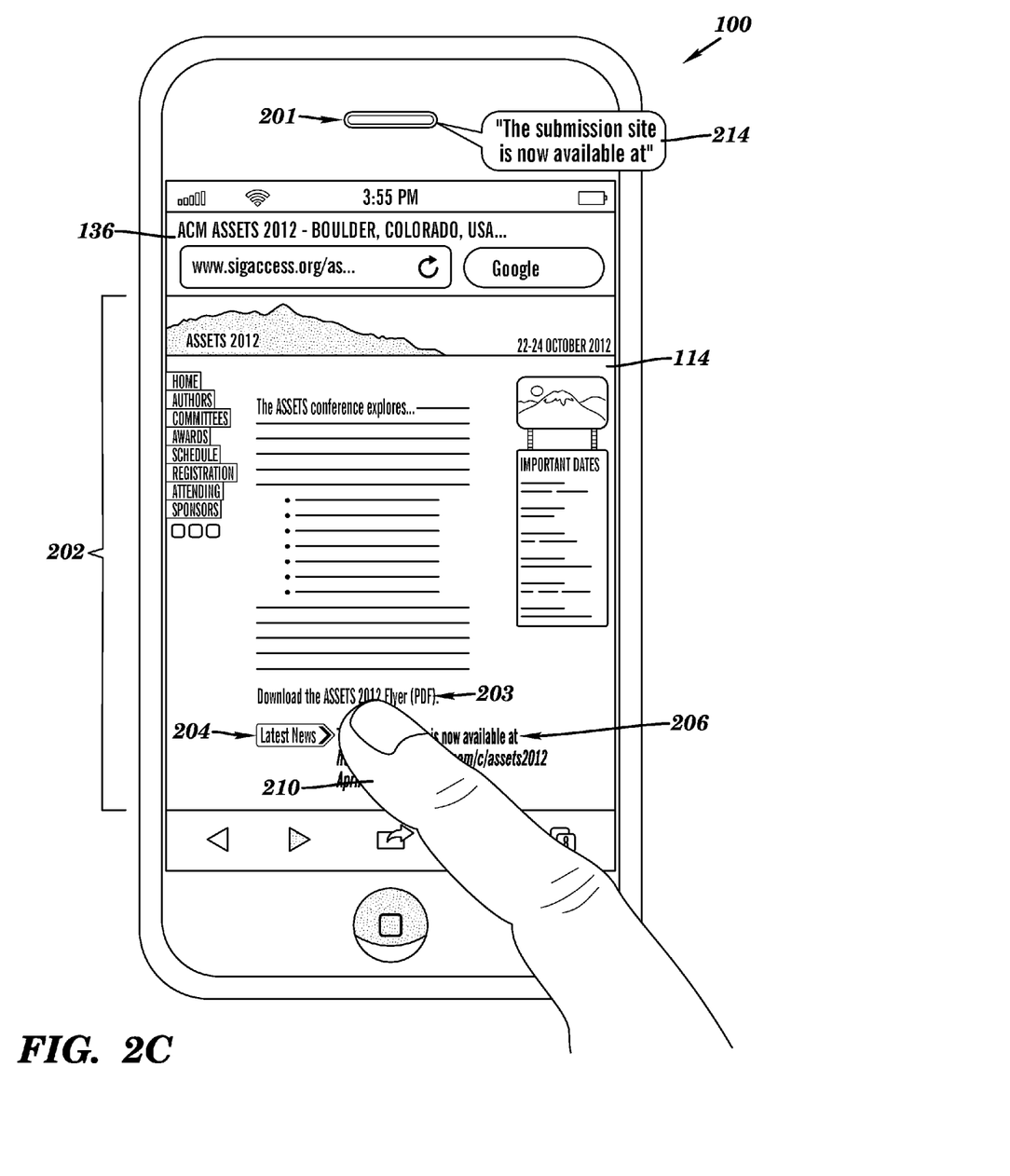
Figure 2D:
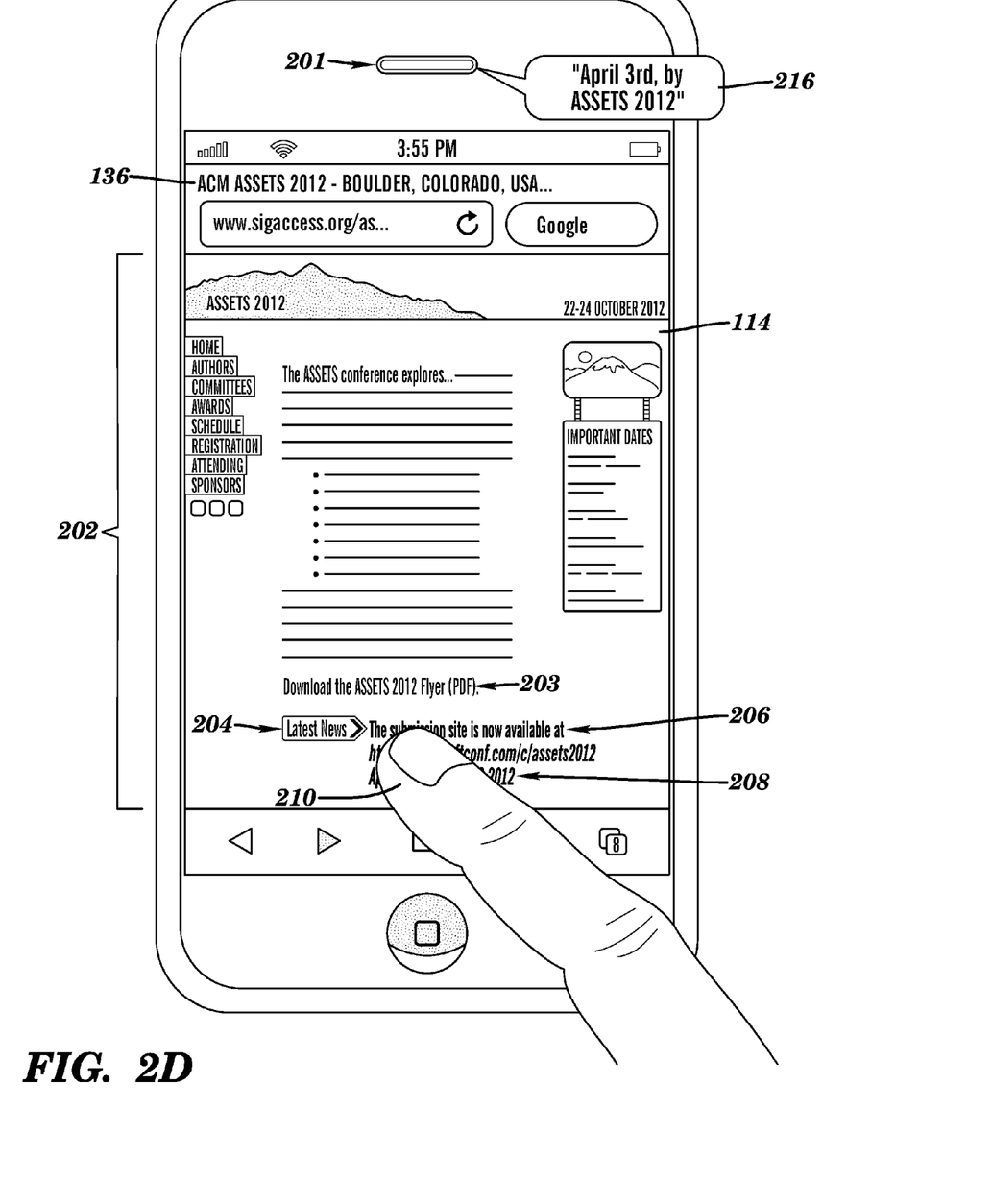

As illustrated in FIG. 2B, a visually impaired user may activate the auditory user interface by, for example, touching a particular portion of the contact-sensitive display 114 that can sense the touch pressure applied by the user's finger 210. In response to receiving the input, the auditory user interface may read aloud the content of the web page 202 located in the portion of the contact-sensitive display 114 selected by the user. In other words, when the visually impaired user touches the button 204, the auditory user interface may cause the speaker 201 to read aloud a text associated with the button 204. In the example illustrated in FIG. 2B, the user may hear a first audio representation 212 corresponding to the button 204, such as "Latest News. Image". In order to find out what other elements are contained within the web page 202, the visually impaired user needs to move his/her finger along the surface of the contact-sensitive display 114. For example, as shown in FIG. 2C, in response to the touch pressure applied to the portion of the contact-sensitive display 114 where the link 206 is located, the auditory user interface may render a second audio representation 214 corresponding to the link 206. Thus, the visually impaired user may hear the following synthesized speech: "The submission site is now available at . . . ". FIG. 2D illustrates further movement of the user's finger 210. In this example, the finger 210 applies touch pressure to the portion of the contact-sensitive display 114 containing the text string 208. In response, the conventional auditory user interface would render a third audio representation 216 corresponding to the text string 208. In other words, the user would now hear "April $3^{rd}$, by Assets 2012".

As described above, the conventional auditory user interface presents all information serially thus requiring the user to wait for some of the data to process. The conventional auditory user interface requires a user to memorize location of each of the spoken elements of the electronic document. Thus, it would be desirable to have an auditory interface with an improved efficiency at which the visually impaired user can work.

In an embodiment of the present invention, the web browser 136 may be integrated with an audio browser 138, which may be configured to enable a visually impaired user to access the webpage and/or electronic document in an auditory manner. In one embodiment, the audio browser 138 may operate as a separate application, widget, or the like.

However, in another embodiment, the audio browser 138 may be configured as a plug-in to the web browser 136. Thus, the audio browser 138 may comprise an optionally downloadable program or program component useable to enable a visually impaired user to navigate electronic document in auditory manner. In accordance with an embodiment of the present invention, the audio browser 138 may be configured to collect textual and non-textual display information generated by the web browser 136 and/or a word processor and configured to generate an audio representation of a subset of the collected display information based on a user defined criteria and control information, as described below.

Figure 3:
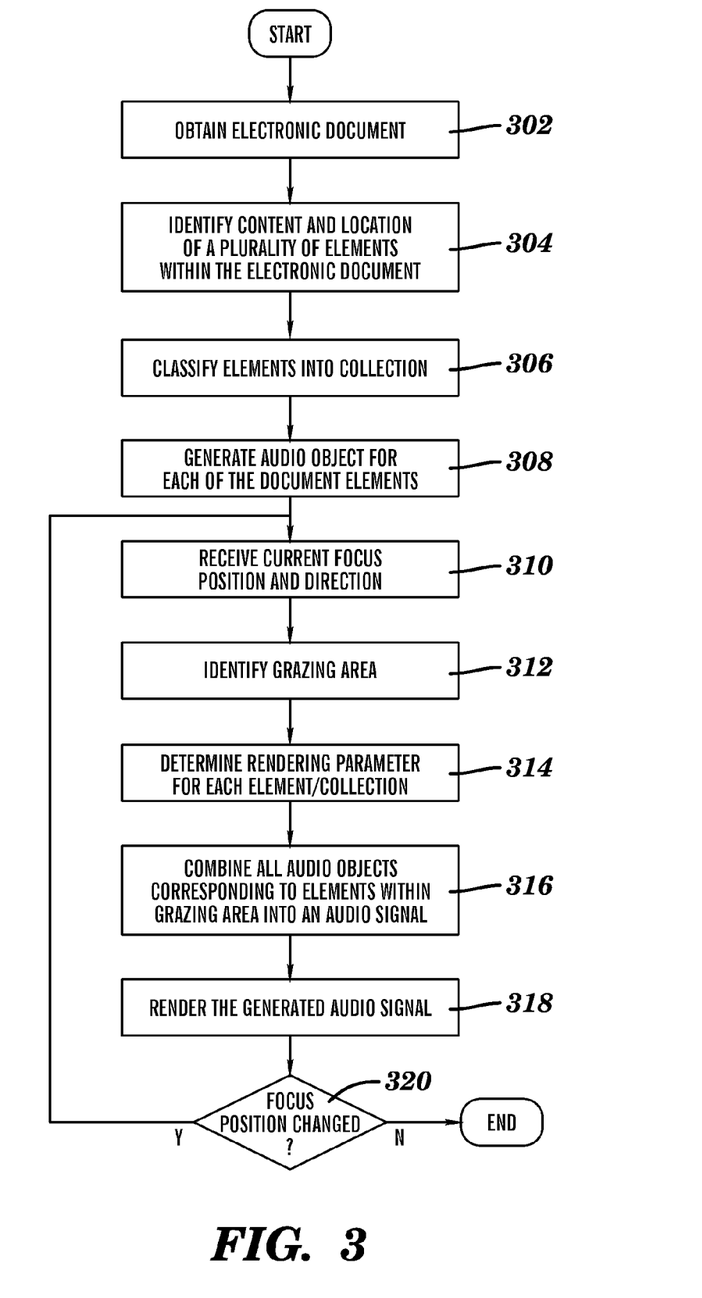
FIG. 3 illustrates steps performed by an audio browser program for generating an audio summary of an electronic document, according to an embodiment of the present invention.

FIG. 3 illustrates steps performed by the audio browser program 138 for generating an audio summary of an electronic document, according to an embodiment of the present invention. At 302, the audio browser program 138 may obtain an electronic document accessed by a visually impaired user from, for example, an application running on the mobile device 100, such as the web browser 136, a word processing application, an email client program, and the like. It should be noted that various embodiments of the present invention contemplate processing both electronic documents containing structured content (i.e. HTML web pages, search results, and the like) and electronic documents containing unstructured content (i.e. text documents containing free flowing text or data). At 304, the audio browser program 138 may process the obtained electronic document in order to identify both content and location of a plurality of elements within the electronic document. In one embodiment of the present invention, the audio browser program 138 may create a common document content data model, known in the art as a Document Object Model (DOM). A DOM is a uniform representation of the content of an electronic document, which is independent of the original format of the document. Content from an electronic document is organized hierarchically in a DOM, which allows for extraction of particular parts of a document. A DOM stores content such as text, formatting information, images and embedded objects from an electronic document, as well as organizational aids such as tables of contents, hyperlinks, bookmarks, headers, footers, location within the electronic document, and page numbers. In some embodiments, the audio browser program 138 may organize the content of an electronic document into a group of named entries that correspond to the sections of the electronic document. The entry names can then be used to retrieve content from the corresponding section of the electronic document. It should be noted that the audio browser program 138 may store a DOM associated with the electronic document in, for example, data storage 128 of the mobile device 100. The audio browser program 138 then creates an audio summary of a portion of the electronic document based on the DOM associated with the electronic document and based on the user specified criteria.

Next, at 306, the audio browser program 138 may utilize the DOM to classify the electronic document elements into one or more collections. In an embodiment of the present invention, the elements may be classified based on content. For example, a plurality of menu item elements may be combined into a menu collection. In an alternative embodiment, the elements of the electronic document may be classified based on a proximity to the current focus position, as described below.

Subsequently to creating the DOM associated with the electronic document, at 308, the audio browser program 138 may generate an audio object for each of the elements identified at 304 and/or the audio browser program 138 may generate an audio object for each collection generated at 306. The term "audio object", as used herein, refers to an electronic form of an audio signal. Each audio object may convey information associated with a corresponding element/collection of the electronic document. For example, an audio object may contain a synthesized speech corresponding to the textual information contained within an electronic document element. Similarly, an audio object may contain a synthesized speech corresponding to the name of the collection generated at 306. Additionally, the audio browser program 138 may also generate audio objects to convey non-textual aspects of the information being delivered to the user. For instance, different types of electronic document elements with which the user needs to interact (buttons, radio buttons, combo boxes, menus, sliders, check boxes, and the like) need to be identified to the visually impaired user by their type in order that the visually impaired user can understand how to interact with the element. Identifying the control type of the electronic document element may be done in a variety of ways. For example, when the electronic document contains a check box, the audio browser program 138 may generate an audio object that can speak the text "check box". Alternatively, the generated audio object may play a sound that represents a check box to the visually impaired user. At least in some embodiments, the generated audio objects may contain sounds that signify the action a visually impaired user should take in order to activate a particular control of the electronic document. It is contemplated that distinct voices and or sounds may be employed to represent various types of elements and/or collections.

Furthermore, the audio browser program 138 may be capable of determining whether to render a collection name or individual elements included in the collection based on the proximity to the current focus position. In other words, if a particular collection of elements is located substantially adjacent to a current focus position within the electronic document then the audio browser program 138 may render to the user audio objects corresponding to each element of the collection. On the other hand, if the collection of elements is located, for example, somewhere near the boundary of the grazing area (discussed below), the user may only hear, for example, the audio object that indicates a name of the collection.

Next, at 310, the audio browser program 138 may obtain user's input indicative of a current position within the electronic document. According to an embodiment of the present invention, the visually impaired user may use a finger and/or a stylus-like device to indicate the current position. In some exemplary embodiments, the finger touch and/or stylus location can be determined based on a global coordinate system of the contact-sensitive display 114. In accordance with various embodiments of the present invention, a single touch by a single finger may also indicate user's desire to navigate the electronic document in a particular direction. By way of example, if a user touches the contact-sensitive display 114 so that his finger points to the left of the current position, the audio browser program 138 may in response render audio objects corresponding to electronic document elements located to the left of the selected position.

Figure 4:
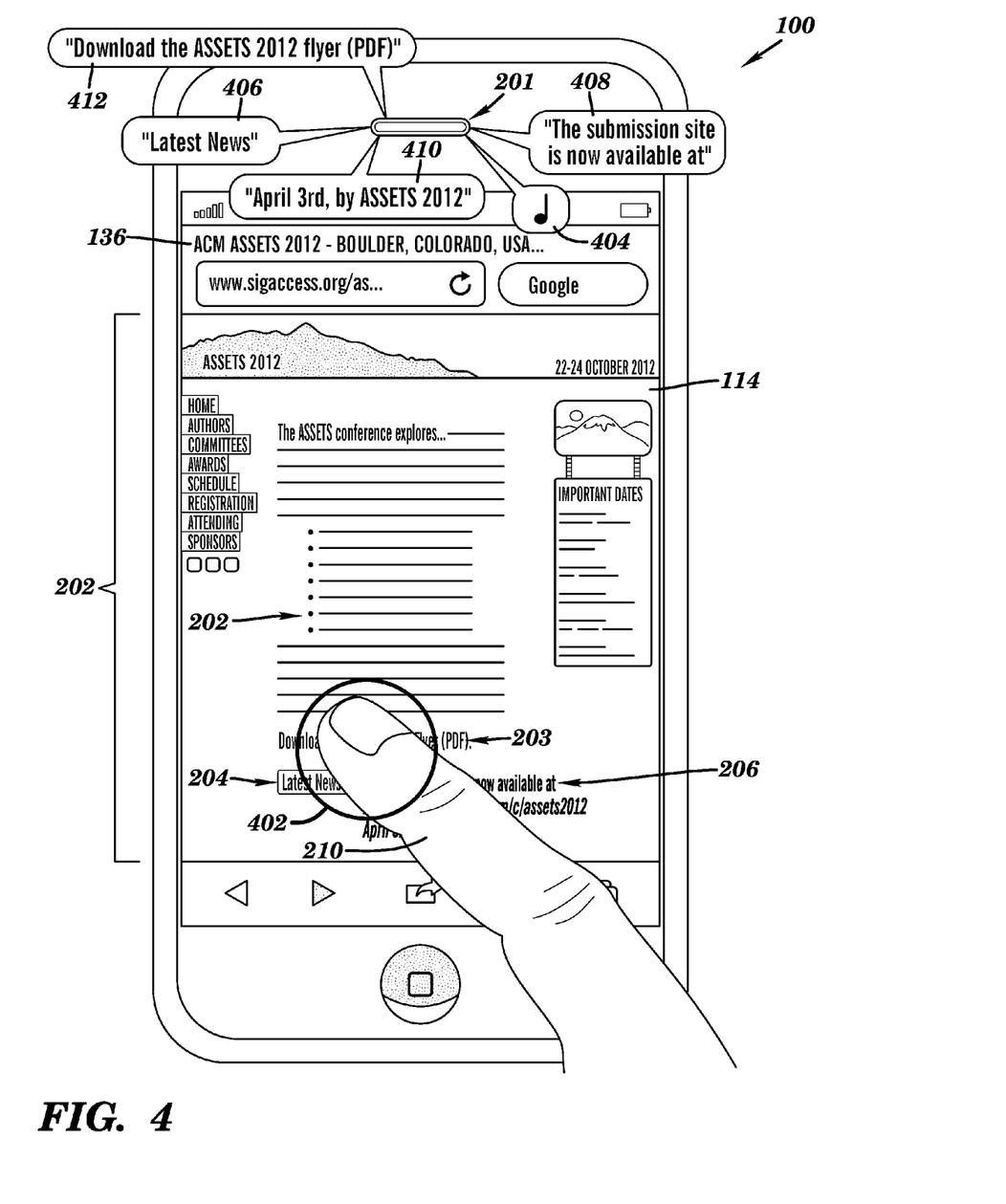
FIG. 4 illustrates an exemplary audio summary corresponding to a portion of an electronic document generated by the audio browser program, according to an embodiment of the present invention.

At 312, the audio browser program 138 may identify a grazing area, shown in FIG. 4. As used herein, the term "grazing area" refers to a predetermined range from the current focus position. In an embodiment of the present invention, the grazing area may comprise a circle having a predetermined radius with a center at the current focus position. In alternative embodiment, the grazing area may be shaped like a cone emanating from the current focus position in a direction specified by the user at 308. It is contemplated that the web browser 136 may render only a portion of the electronic document on the contact-sensitive display 114. Therefore, in some embodiments of the present invention the grazing area may extend beyond the visible portion of the electronic document.

Then, at 314, the audio browser program 138 may determine values of one or more rendering parameters for each audio object representing a corresponding electronic document element within the grazing area. The rendering parameters may include at least one of volume, tempo, treble and bass, stereo-width, surround, and dynamic range. For example, in an embodiment of the present invention a value of the volume parameter may be adjusted for each audio object representing a document element within the grazing area based on a proximity to the current focus position. In other words, the audio browser program 138 may render the audio objects representing electronic document elements located in the immediate vicinity of the current focus position with a higher volume setting as compared to the audio objects representing the document elements located further from the current focus position. According to an embodiment of the present invention, the farther away the element is from the current focus position, the weaker is the sound of the corresponding audio object. Similarly, the audio browser program 138 may adjust the stereo width settings for each of the audio objects to indicate a relative direction of the corresponding document elements with respect to the current focus position. As a consequence of such adjustment, the visually impaired user may perceive the sound of the signal as coming from a particular direction indicative of the corresponding element's position within the grazing area.

Next, at 316, the audio browser program 138 may generate a multi channel audio signal by digitally encoding a plurality of audio objects that correspond to the plurality of electronic document elements contained within the grazing area. Various techniques and standards have been developed for communication of such multi channel audio signals. For example, six discrete channels representing a 5.1 surround sound system may be transmitted in accordance with standards such as the Advanced Audio Coding (AAC), Dolby Digital, and the like. In an alternative embodiment of the present invention, the multi-channel audio signal can be a stereo signal, which comprises only two channels. The generated multi channel audio signal represents an audio summary of a portion of an electronic document contained within the grazing area. In an embodiment of the present invention, the plurality of audio objects can be spatially audio encoded based on the rendering parameters determined at step 314. As previously indicated, the grazing area may extend beyond the portion of the electronic document rendered on the contact-sensitive display 114. Accordingly, the generated audio summary may include elements that are not currently rendered by the web browser program 136 on the contact-sensitive display 114. In other words, the audio browser program 138 facilitates an awareness of the not yet displayed electronic document elements contained within the user-specified grazing area.

Subsequently, at step 318, the audio browser program 138 may send the audio summary to the audio interface 112 of the mobile device 100. In an embodiment of the present invention, the audio interface 112 may include a decoder capable of decoding the rendering parameters of the multi channel audio signal in accordance with the selected standard. If the mobile device 100 has a relatively limited processing power the decoder of the audio interface 112 may be computationally optimized. Furthermore, in a preferred embodiment, the multi channel audio signal may be rendered to a visually impaired user through the earplugs or headphones coupled to the mobile device 100. In an embodiment of the present invention, the multi channel surround sound audio signal may be delivered by employing, for example, but not limited to, 3D audio or binaural rendering techniques well-known in the art.

At decision block 320, the audio browser program 138 may determine whether the current focus position within the electronic document has changed. In other words, the audio browser program 138 may determine whether the user provided a new input indicative of a new current position and/or direction within the electronic document. In response to determining that the user provided an updated position and/or direction, the audio browser program 138 may repeat 310 through 318 in order to generate a new audio summary based on the updated user specified spatial and/or directional input.

FIG. 4 illustrates an exemplary audio summary corresponding to a portion of an electronic document generated by the audio browser program 138, according to an embodiment of the present invention. As shown in FIG. 4, the web browser program 136 may render an electronic document, such as the webpage 202, on the contact-sensitive display 114 of the mobile device 100. A visually impaired user may select a desirable position and/or direction within the electronic document 202 by, for example, touching the contact-sensitive display 114 of the mobile device 100 with his finger 210. FIG. 4 also illustrates the grazing area 402 around the user provided focus position. As previously indicated, the grazing area may also be shaped like a cone emanating from the current focus position in a direction specified by the user. In response to obtaining the user input and determining the grazing area, the audio browser program 138 may identify the elements of the electronic document 202 contained within the grazing area 402, such as, the button 204 and the link 203. Each of the identified elements is associated with a corresponding audio object, such as audio objects 404 through 412. As a result of performing steps described above in conjunction with FIG. 3, the audio browser program 138 generates an audio summary which may consist of digitally encoded audio objects 404 through 412. Each of the audio objects may include synthesized or recorded speech, synthesized or recorded sounds and tones, interpreted Musical Instrument Digital Interface (MIDI) sounds and other digital methods of generating audio information. As illustrated in FIG. 4, the audio object 404 may be, for example, a serial tone 'ding' indicating that element 204 is a button. In an embodiment of the present invention, the audio summary may be generated as a multi channel audio signal, as described above. The audio interface 112 of the mobile device 100 may render the generated audio summary though either speaker 201 or, preferably, through a set of headphones connected to the mobile device 100. Advantageously, the audio interface 112 may render multiple audio objects, such as audio objects 404 through 412, substantially simultaneously, using distinct rendering parameters. It is well known that a human being can focus attention on a single source of sound even in an environment that contains many such sources. This phenomenon is often called the "cocktail-party effect". It is contemplated that the audio browser program 138 may be capable of adjusting rendering parameters associated with each of the audio objects based on the spatial relation between the corresponding elements of the electronic document. The rendering parameters may include, for example, spatial parameters describing a spatial perception of the multi channel audio signal. Thus, the audio browser program 138 provides an enhanced audio browsing capability while circumventing the time bottleneck inherent in the serial mode of operation of the conventional screen reading programs. Various embodiments of the present invention enable a new type of audio based navigation, where visually impaired users are capable of moving between, for example, "overheard" elements of electronic documents.

Figure 5:
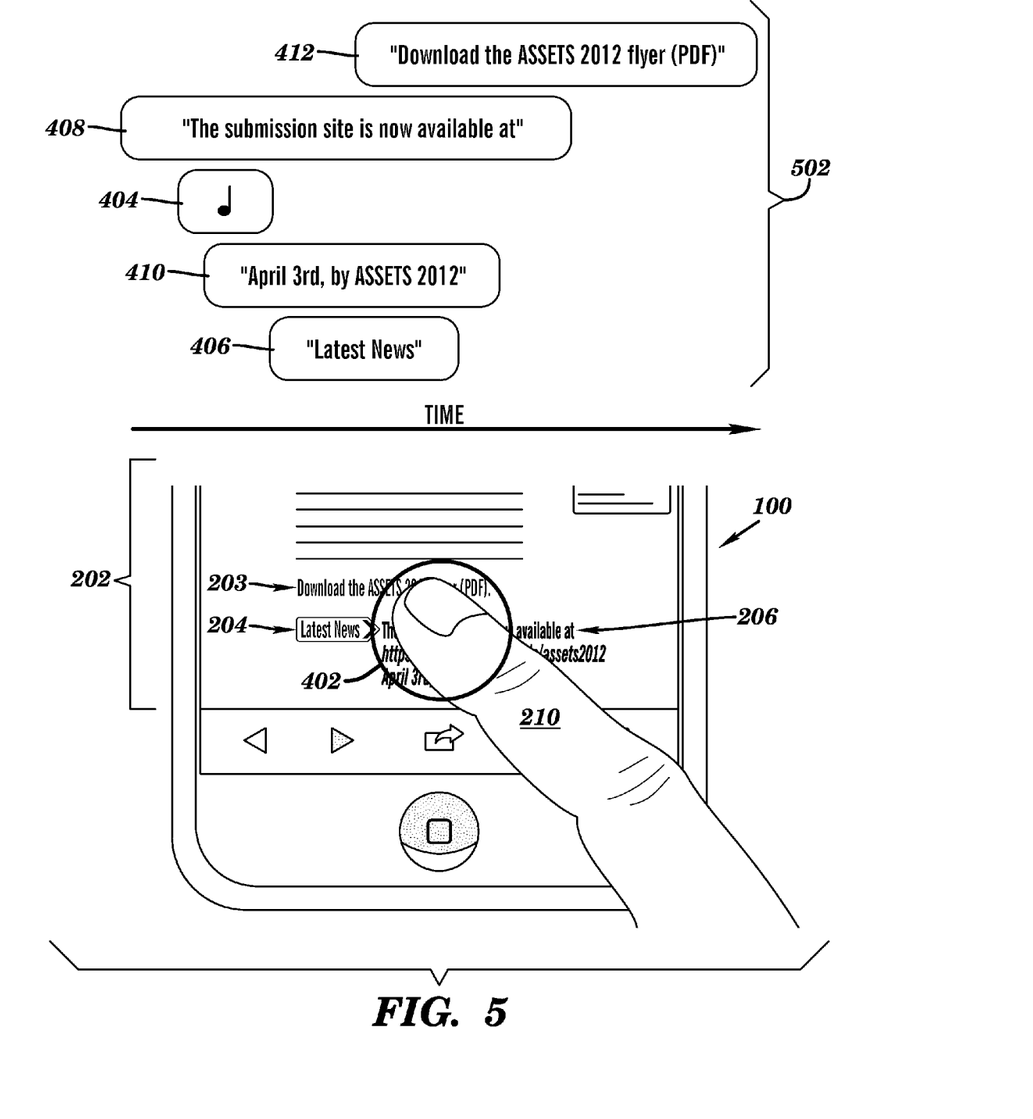
FIG. 5 illustrates an exemplary audio summary corresponding to a portion of an electronic document generated by the audio browser program, according to another embodiment of the present invention.

FIG. 5 illustrates an exemplary audio summary 502 corresponding to a portion of an electronic document generated by the audio browser program 138, according to another embodiment of the present invention. As shown in FIG. 5, in this embodiment the audio web browser program 138 may digitally encode the audio objects 404 through 412 so that they may be simultaneously rendered in a time-staggered mode based on a spatial relation between the corresponding elements within the electronic document with respect to the current focus position. In other words, audio objects corresponding to the elements (i.e. link 206) of the electronic document located near the user specified current focus point may be rendered earlier within the audio summary signal as compared to the audio objects representing elements (i.e. link 203) located further away from the current focus position. This technique may improve user's ability to switch attention between multiple audio objects rendered within the audio summary representing a portion of the electronic document.

Thus, the audio summary generated by the audio browser program 138 in accordance with various embodiments of the present invention allows a visually impaired user to hear a particular section of an electronic document, thereby precluding the need to hear the entire electronic document, and allows the user to navigate only through information that he or she is interested in. Use of the audio summary on the mobile device 100 enhances navigation in an electronic document for both blind and visually impaired users. Advantageously, rather than hearing the potentially large electronic document sequentially, which makes the audio navigation through large electronic documents time-consuming, the users may iteratively navigate the electronic document based on the provided audio summary. This improves the efficiency at which a visually impaired user can work.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computing device, partly on the user's computing device, as a stand-alone software package, partly on the user's computing device and partly on a remote computing device or entirely on the remote computing device or server computer. In the latter scenario, the remote computing device may be connected to the user's computing device through any type of network, including a local area network (LAN) or a wide area network (WAN), or the connection may be made to an external computing device (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, mobile device or other programmable data processing apparatus to produce a machine, such that the instructions, which execute via the processor of the computing device or other programmable data processing apparatus, create means for implementing the functions/acts specified in the flowchart and/or block diagram block or blocks.

These computer program instructions may also be stored in a computer readable medium that can direct a computing device, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computing device, other programmable data processing apparatus, or other devices to cause a series of operational steps to be performed on the computing device, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description above has been presented for illustration purposes only. It is not intended to be an exhaustive description of the possible embodiments. One of ordinary skill in the art will understand that other combinations and embodiments are possible.

What is claimed is:

1. A method for generating an audio summary of a portion of an electronic document, the method comprising:
receiving, by a computer, an electronic document;
identifying, by the computer, content and location of a plurality of document elements included in the electronic document;
creating a Document Object Model (DOM) that hierarchically organizes the document elements;
classifying one or more pluralities of the document elements into respective collections based on the hierarchical organization of each plurality of document elements in the DOM, each collection having an associated name;
generating audio objects corresponding to text information within each of the document elements and each collection name;
rendering the electronic document for display on a display screen, and displaying the rendered document on a display screen;
receiving user input indicating a focus position within the displayed electronic document;
generating an audio signal that includes one or more of the audio objects based on the proximity to the focus position of the corresponding document elements within a predetermined range from the focus position, wherein if a collection of document elements is located near the boundary of the predetermined range, the audio object corresponding to the collection name will be included in the audio signal, and if the collection of document elements is in the immediate vicinity of the focus position, the audio objects corresponding to the document elements will be included in the audio signal; and
rendering the audio signal to the user.

2. The method of claim 1, wherein the audio signal comprises a multi channel signal.

3. The method of claim 2, wherein rendering the audio signal further comprises simultaneously rendering the audio subset using multiple channels.

4. The method of claim 1, wherein generating the plurality of audio objects further comprises associating at least one rendering parameter with each of the plurality of audio objects and wherein generating the audio signal comprises adjusting the at least one rendering parameter for the audio subset based on the spatial relation between elements of the elements subset.

5. The method of claim 4, wherein the at least one rendering parameter includes at least one of volume, tempo, treble, bass, or stereo-width.

6. The method of claim 1, wherein the predetermined range from the focus position is defined by a circle having a center at the focus position.

7. The method of claim 1, wherein the computing device comprises a mobile computing device.

8. The method of claim 1, wherein receiving user input indicating a focus position further comprises:
receiving user input from a contact-sensitive display in response to a finger touch to the display; and
determining a focus position and a direction in which the finger touch points from the user input;
wherein the predetermined range is conical-shaped emanating a distance from the focus position in the direction in which the finger touch points.

9. The method of claim 1, wherein the predetermined range from the focus position extends beyond the visible portion of the rendered electronic document.

10. A computer program product for generating an audio summary of a portion of an electronic document, the computer program product comprising one or more computer-readable tangible storage devices and a plurality of program instructions stored on at least one of the one or more computer-readable tangible storage devices, the plurality of program instructions comprising:
program instructions to receive an electronic document;
program instructions to identify content and location of a plurality of document elements included in the electronic document;
program instructions to create a Document Object Model (DOM) that hierarchically organizes the document elements;
program instructions to classify one or more pluralities of the document elements into respective collections based on the hierarchical organization of each plurality of document elements in the DOM, each collection having an associated name;
program instructions to generate of audio objects corresponding to the text information within each of the document elements and each collection name;
program instructions to render the electronic document for display on a display screen, and displaying the rendered document on a display screen;
program instructions to receive user input indicating a focus position within the displayed electronic document;

program instructions to generate an audio signal that includes one or more of the based on the proximity to the focus position of the corresponding document elements within a predetermined range from the focus position, wherein if a collection of document elements is located near the boundary of the predetermined range, the audio object corresponding to the collection name will be included in the audio signal, and if the collection of document elements is in the immediate vicinity of the focus position, the audio objects corresponding to the document elements will be included in the audio signal; and program instructions to render the audio signal to the user.

11. The computer program product of claim 10, wherein the audio signal comprises a multi channel signal.

12. The computer program product of claim 11, wherein the program instructions to render the audio signal comprise program instructions to simultaneously render the audio subset using multiple channels.

13. The computer program product of claim 10, wherein the program instructions to generate the plurality of audio objects further comprise program instructions to associate at least one rendering parameter with each of the plurality of audio objects and wherein the program instructions to generate the audio signal comprise program instructions to adjust the at least one rendering parameter for the audio subset based on the spatial relation between elements of the elements subset.

14. The computer program product of claim 13, wherein the at least one rendering parameter includes at least one of volume, tempo, treble, bass, or stereo-width.

15. The computer program product of claim 10, wherein the predetermined range from the focus position is defined by a circle having a center at the focus position.

16. The computer program product of claim 10, wherein the program instructions to receiving user input indicating a focus position further comprises:

program instructions to receive user input from a contact-sensitive display in response to a finger touch to the display; and program instructions to determine a focus position and a direction in which the finger touch points from the user input;

wherein the predetermined range is conical-shaped emanating a distance from the focus position in the direction in which the finger touch points.

17. The computer program product of claim 10, wherein the predetermined range from the focus position extends beyond the visible portion of the rendered electronic document.

18. A computer system for generating an audio summary of a portion of an electronic document, the computer system comprising one or more processors, one or more computer-readable tangible storage devices, and a plurality of program instructions stored on at least one of the one or more storage devices for execution by at least one of the one or more processors, the plurality of program instructions comprising:

program instructions to receive an electronic document;

program instructions to identify content and location of a plurality of document elements included in the electronic document;

program instructions to create a Document Object Model (DOM) that hierarchically organizes the document elements;

program instructions to classify one or more pluralities of the document elements into respective collections based on the hierarchical organization of each plurality of document elements in the DOM, each collection having an associated name;

program instructions to generate of audio objects corresponding to the text information within each of the document elements and each collection name;

program instructions to render the electronic document for display on a display screen, and displaying the rendered document on a display screen;

program instructions to receive user input indicating a focus position within the displayed electronic document;

program instructions to generate an audio signal that includes one or more of the based on the proximity to the focus position of the corresponding document elements within a predetermined range from the focus position, wherein if a collection of document elements is located near the boundary of the predetermined range, the audio object corresponding to the collection name will be included in the audio signal, and if the collection of document elements is in the immediate vicinity of the focus position, the audio objects corresponding to the document elements will be included in the audio signal; and program instructions to render the audio signal to the user.

* * * * *